(12) United States Patent
Li et al.

(10) Patent No.: US 9,436,739 B2
(45) Date of Patent: Sep. 6, 2016

(54) DYNAMIC PRIORITY-BASED QUERY SCHEDULING

(71) Applicant: VMware, Inc., Palo Alto, CA (US)

(72) Inventors: Zhenmin Li, San Jose, CA (US); Chengdu Huang, Mountain View, CA (US); Jay A. Patel, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 248 days.

(21) Appl. No.: 14/106,313

(22) Filed: Dec. 13, 2013

(65) Prior Publication Data
US 2015/0169684 A1    Jun. 18, 2015

(51) Int. Cl.
*G06F 17/30* (2006.01)

(52) U.S. Cl.
CPC ... *G06F 17/30545* (2013.01); *G06F 17/30492* (2013.01)

(58) Field of Classification Search
USPC .......................................... 707/718–720, 774
See application file for complete search history.

(56) References Cited

U.S. PATENT DOCUMENTS

| | | | | |
|---|---|---|---|---|
| 4,145,735 | A * | 3/1979 | Soga | G06F 9/4837 710/264 |
| 6,148,322 | A * | 11/2000 | Sand | G06F 9/4837 718/102 |
| 6,430,640 | B1 * | 8/2002 | Lim | G06F 13/18 710/200 |
| 6,633,402 | B1 * | 10/2003 | Shima | G06F 3/1215 358/1.14 |
| 6,775,666 | B1 * | 8/2004 | Stumpf | G06F 17/30663 |
| 7,509,671 | B1 * | 3/2009 | Bedell | G06F 9/5038 718/102 |
| 7,562,362 | B1 * | 7/2009 | Paquette | G06F 9/4881 714/100 |
| 7,693,813 | B1 | 4/2010 | Cao et al. | |
| 7,984,447 | B1 * | 7/2011 | Markov | G06F 9/4881 709/201 |
| 9,081,611 | B1 * | 7/2015 | Melhuish | G06F 9/4881 |
| 2002/0083251 | A1 * | 6/2002 | Chauvel | G06F 1/206 710/240 |
| 2003/0058837 | A1 * | 3/2003 | Denney | H04L 12/2801 370/352 |
| 2003/0105911 | A1 * | 6/2003 | Jones | G06F 13/36 710/309 |
| 2004/0088274 | A1 | 5/2004 | Xu et al. | |
| 2005/0165753 | A1 | 7/2005 | Chen et al. | |
| 2005/0229151 | A1 * | 10/2005 | Gupta | G06Q 10/06 717/101 |
| 2007/0055555 | A1 * | 3/2007 | Baggett | G06F 17/30457 705/5 |
| 2007/0094343 | A1 * | 4/2007 | Sangle | H04L 67/1095 709/207 |
| 2007/0118838 | A1 * | 5/2007 | Tsujino | G06F 9/4881 718/103 |
| 2007/0168336 | A1 | 7/2007 | Ransil et al. | |
| 2009/0138318 | A1 * | 5/2009 | Hawkins | G06F 9/5038 705/7.27 |
| 2009/0216718 | A1 * | 8/2009 | Agrawal | G06F 17/30474 |
| 2009/0288090 | A1 * | 11/2009 | Ujibashi | G06F 9/5011 718/103 |
| 2010/0168994 | A1 * | 7/2010 | Bourque | G01C 21/3617 701/532 |
| 2011/0191779 | A1 * | 8/2011 | Ujibashi | G06F 9/46 718/102 |
| 2011/0208713 | A1 * | 8/2011 | Mintz | G06F 17/30283 707/706 |
| 2012/0023500 | A1 * | 1/2012 | Karstens | G06F 9/50 718/103 |
| 2012/0194525 | A1 * | 8/2012 | Hartog | G06F 9/4881 345/503 |
| 2012/0290707 | A1 * | 11/2012 | Ennis | H04L 43/10 709/224 |
| 2012/0317578 | A1 * | 12/2012 | Kansal | G06F 9/5077 718/104 |
| 2013/0074088 | A1 * | 3/2013 | Purcell | G06F 9/4881 718/103 |
| 2013/0173662 | A1 * | 7/2013 | Kaplinger | G06F 17/30463 707/774 |
| 2014/0115598 | A1 * | 4/2014 | Matousek | G06F 9/5061 718/104 |
| 2015/0026692 | A1 * | 1/2015 | Ghosh | G06F 9/4881 718/103 |

* cited by examiner

*Primary Examiner* — Cam-Linh Nguyen

(57) ABSTRACT

Techniques for scheduling query execution are provided. In one embodiment, a computer system can receive a query to be executed and can assign a priority to the query. The computer system can further divide the query into a plurality of sub-queries and can assign a sub-priority to each sub-query, where the sub-priority is based on a resource consumption metric of the query. The computer system can then select, from a plurality of sub-query pools, a sub-query pool that includes sub-queries of queries that have the same priority as the query, and can add the plurality of sub-queries to the selected sub-query pool.

24 Claims, 4 Drawing Sheets

DYNAMIC PRIORITY-BASED QUERY SCHEDULING

BACKGROUND

In a typical information retrieval system, it is common for multiple clients (e.g., users, applications, etc.) to concurrently submit queries to the system for execution. If the information retrieval system does not have sufficient computing resources to run all of these queries simultaneously, the system will generally need to determine which queries to process immediately and which to put on hold for later execution. This task is known as query scheduling.

One way to perform query scheduling is to execute incoming queries in the order they arrive (referred to as a "first-come-first-serve" approach). However, a significant problem with this approach is that it cannot differentiate between queries that have differing response time requirements. For example, user queries (i.e., queries originating from human users via, e.g., an interactive UI) are typically time-sensitive and thus should be executed as soon as possible. On the other hand, automated queries (e.g., batch queries, precomputational queries, etc.) are generally less time-sensitive, and thus can tolerate some delay in response time. If queries are simply scheduled according to their order of arrival, some time-sensitive queries may be forced to wait behind time-insensitive queries, which can adversely affect the usability and responsiveness of the system.

Another way to perform query scheduling is to implement a fixed priority scheme. With this scheme, each query is assigned a priority based on some property known at the time of query arrival (e.g., the identity or type of the query requestor, etc.), and queries are scheduled according to their assigned priorities. This can avoid the problem noted above with the first-come-first-serve approach, since time-sensitive queries (e.g., user queries) can be prioritized over less time-sensitive queries (e.g., automated queries). Unfortunately, fixed priority scheduling also suffers from certain drawbacks. For instance, while fixed priority scheduling can be used to classify and prioritize queries based on non-runtime properties, it generally cannot distinguish "heavy" queries (i.e., queries that take a relatively long time to execute, such as on the order of minutes) from "light" queries (i.e., queries that take a relatively short time to execute, such as on the order of milliseconds or seconds), since query execution time is only ascertainable once a query has started running. This means that heavy queries can potentially be scheduled before, and thus block, light queries within a given priority class, thereby increasing average query response time.

SUMMARY

Techniques for scheduling query execution are provided. In one embodiment, a computer system can receive a query to be executed and can assign a priority to the query. The computer system can further divide the query into a plurality of sub-queries and can assign a sub-priority to each sub-query, where the sub-priority is based on a resource consumption metric of the query. The computer system can then select, from a plurality of sub-query pools, a sub-query pool that includes sub-queries of queries that have the same priority as the query, and can add the plurality of sub-queries to the selected sub-query pool.

The following detailed description and accompanying drawings provide a better understanding of the nature and advantages of particular embodiments.

DETAILED DESCRIPTION

Figure 1:
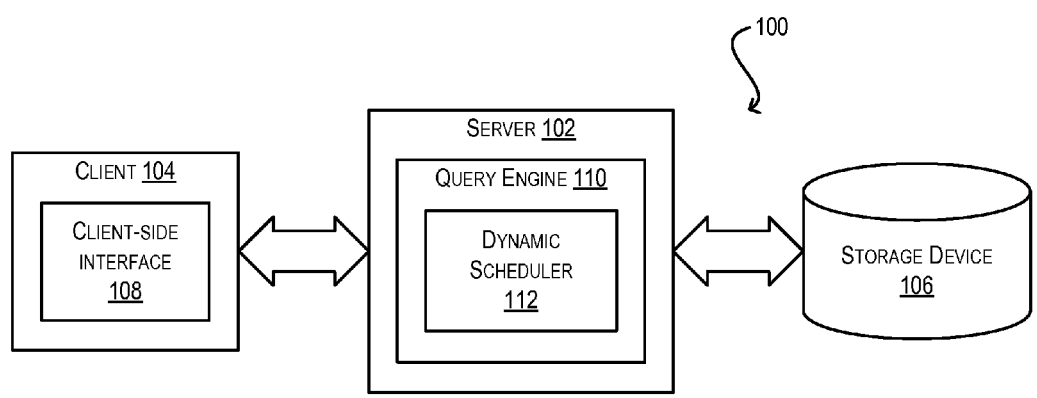
FIG. 1 depicts an information retrieval system according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques for scheduling query execution in an information retrieval system. In one set of embodiments, at the time a query is received, a dynamic scheduler of the system can assign a priority to the query and a sub-priority to one or more sub-queries of the query. The priority can be based on the time-sensitivity of the query, while the sub-priorities can be based on a resource consumption metric (e.g., CPU, I/O, or memory usage) of the query. Upon assigning the priority and sub-priorities, the dynamic scheduler can add the sub-queries to a sub-query pool that comprises sub-queries of queries that share the same priority as the received query.

When a CPU becomes available for performing query processing, the dynamic scheduler can identify the highest priority sub-query pool that includes pending (i.e., not yet executed) sub-queries. The dynamic scheduler can then update the sub-priorities of the sub-queries in the identified sub-query pool in view of the most recent resource consumption statistics for their respective parent queries, and can select the sub-query with the highest updated sub-priority for execution. This process (i.e., sub-query pool identification, dynamic updating of sub-priorities, and sub-query selection) can be repeated as further CPU(s) become available until all of the pending sub-queries in the system have been executed.

With the techniques above, many of limitations associated with existing query scheduling approaches (e.g., first-come-first-serve, fixed priority) can be avoided. For instance, by assigning each incoming query a priority based on its time sensitivity, the dynamic scheduler can ensure that time-sensitive queries are prioritized over less time-sensitive queries, thereby improving the responsiveness of the system. This is in contrast with the first-come-first-serve approach, which cannot differentiate between queries that have different response time requirements.

Further, by dividing incoming queries into sub-queries that are each assigned a sub-priority, dynamically updating sub-priorities in view of query-level resource consumption, and selecting sub-queries for execution based on their dynamically updated sub-priorities, the dynamic scheduler can better manage situations where heavy queries need to be scheduled alongside light queries. For example, in certain embodiments, the dynamic scheduler can dynamically adjust the sub-priorities of sub-queries that belong to heavy queries to a lower level than the sub-priorities of sub-queries that belong to light queries. This, in turn, can cause the dynamic scheduler to favor the sub-queries of light queries over the sub-queries of heavy queries for execution, thereby increasing the likelihood that such light queries will return results quickly. This is in contrast to fixed priority scheduling, which may schedule heavy queries before light queries within a given priority class and thus cause the light queries to be blocked for an undesirably long period of time.

FIG. 1 depicts an example information retrieval system 100 according to an embodiment. As shown, information retrieval system 100 includes a server 102 that is in communication with a client 104 and a storage device 106. Although only a single server, client, and storage device are depicted, it should be appreciated that any number of these entities may be supported.

Client 104 is an end-user computing device, such as a desktop computer, a laptop computer, a personal digital assistant, a smartphone, a tablet, or the like. Client 104 is configured to execute (via, e.g., a standard web browser or proprietary software) a client-side interface 108, which enables a user of client 104 to interact with server 102 in order to retrieve data residing on storage device 106. For example, the user may use client-side interface 108 to submit queries, receive and view query results, and the like.

Server 102 is a computer system, such as a standalone or rack-mounted server system, that is configured to execute a query engine 110 for servicing queries submitted by client 104 (and other clients that are external or internal to server 102). Generally speaking, query engine 110 can perform functions such as parsing incoming queries, executing the queries (either fully or in part) against data residing on storage device 106, and returning query results to the original requestors. In situations where query engine 110 receives a large number of concurrent queries that cannot be executed simultaneously, query engine 110 can also perform a query scheduling function for determining an execution order for the queries.

As noted the Background section, there are a number of existing approaches for implementing query scheduling, such as first-come-first-serve and fixed priority. However, the first-come-first-serve approach cannot distinguish between time-sensitive and time-insensitive queries, while the fixed priority approach cannot distinguish between heavy and light queries within a particular priority class. These deficiencies can result in poor system responsiveness and/or unnecessarily high average query response time.

To address these and other similar issues, query engine 110 of server 102 can include a novel query scheduling module, shown as dynamic scheduler 112. As described in further detail below, dynamic scheduler 112 can implement one or more of the following features: (1) the assignment of a priority to each incoming query, where the priority is based on the query's time sensitivity; (2) the division of each query into a number of sub-queries; (3) the assignment of a sub-priority to each sub-query, where the sub-priority reflects a resource consumption metric (e.g., CPU, memory, or I/O usage) of the sub-query's parent query; (4) the dynamic adjustment of sub-priorities in view of changes to the runtime resource consumption of the parent queries; and (5) the selection of sub-queries for execution based on the query priorities and the dynamically adjusted sub-priorities. With these features, dynamic scheduler 112 can ensure that time-sensitive queries are given priority over less time-sensitive queries (thereby improving system responsiveness), and also increase the likelihood that light queries will be completed before heavy queries having the same time sensitivity (thereby reducing average query response time).

Figure 2:
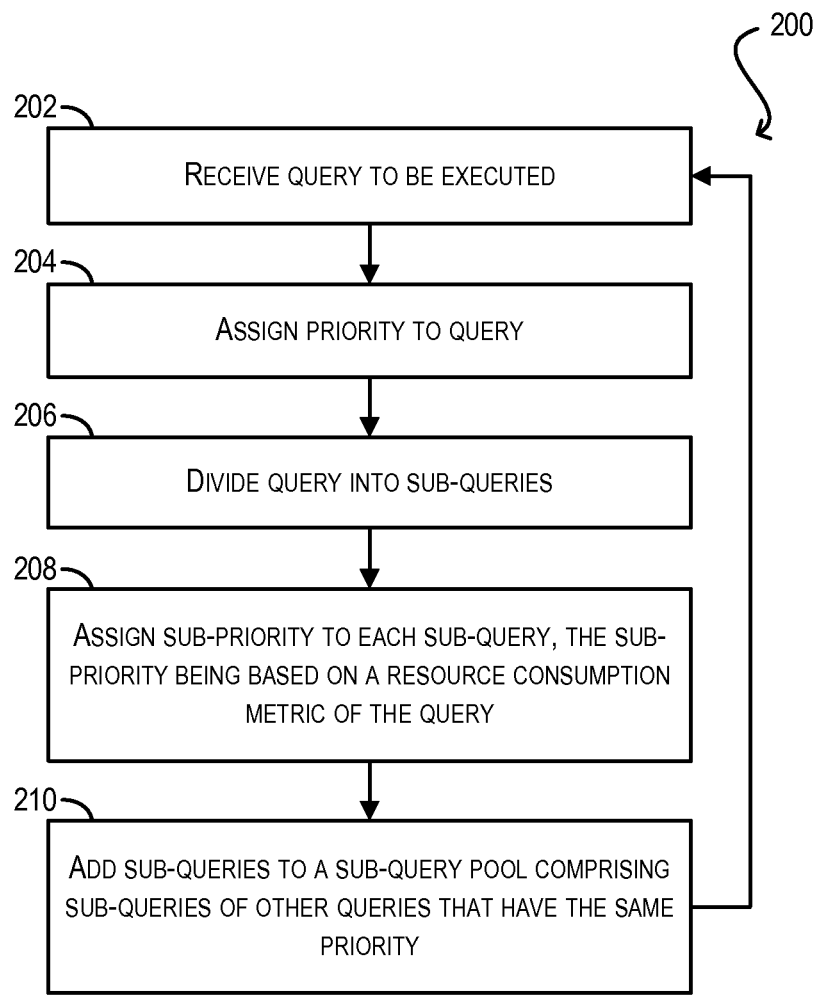
FIG. 2 depicts a flowchart for assigning a priority and sub-priorities to an incoming query according to an embodiment.

FIG. 2 depicts a flowchart 200 of an initial processing pass that dynamic scheduler 112 can apply to incoming queries according to an embodiment. At block 202, dynamic scheduler 112 can receive a query to be executed. The query may be, e.g., a user query that is submitted by a human user operating client-side interface 108 of client 104, or an automated query (e.g., a batch query, precomputational query, etc.) that is submitted by a software agent/application running on server 102 (or some other system coupled with server 102).

At block 204, dynamic scheduler 112 can assign a priority to the query. In various embodiments, the assigned priority can be based on the time sensitivity of the query, as determined by one or more predefined rules. For instance, if the query originated from a human user (in other words, is a user query), dynamic scheduler 112 can assign a relatively high priority to the query, since user queries are typically submitted as part of an interactive workflow and thus have strict response time requirements. On the other hand, if the query originated from a software agent/application (in other words, is an automated query), dynamic scheduler 112 can assign a relatively low priority to the query, since automated queries are typically submitted as part of an offline or background process and thus can tolerate some delay in response time.

At block 206, dynamic scheduler 112 can divide the query into a number of sub-queries. As used herein, the term "sub-query" refers to an independent sub-unit of processing for a query, such that the complete result for the query can be determined by executing each sub-query individually and combining the sub-query results into an aggregated query result.

In one set of embodiments, the data corpus of information retrieval system 100 (i.e., the body of data to be searched by system 100) can be organized into a plurality of buckets, where each bucket includes a subset of the data corpus that spans a range within a particular data dimension. In these embodiments, each sub-query can correspond to an instance of the query that is constrained to data within a single bucket. For example, if the data corpus of information retrieval system 100 comprises time series data that is organized into buckets representing distinct, non-overlapping time ranges, each sub-query can correspond to an instance of the query that is constrained to a particular bucket time range.

In other embodiments, the sub-query division at block 206 can be based on other factors and/or alternative organizations of the data corpus of information retrieval system 100.

Once the query has been divided into sub-queries, dynamic scheduler 112 can assign a sub-priority to each sub-query (block 208). This sub-priority can be the same for every sub-query of the query, and can reflect a resource consumption metric of the query. For instance, the sub-priority can reflect an amount of CPU, memory, and/or I/O that the query has consumed during execution. Since queries do not consume any resources prior to beginning execution, the sub-priority for each sub-query can be initialized to a zero or null value at block 208. As described with respect to FIG. 3 below, dynamic scheduler 112 can later update these sub-priorities during query runtime in order to prioritize the sub-queries of lighter queries (i.e., queries that have consumed relatively less resources) over the sub-queries of heavier queries (i.e., queries that have consumed relatively more resources) for execution.

Finally, at block 210, dynamic scheduler 112 can add the sub-queries for the query to a "sub-query pool" that includes sub-queries of other queries that have the same assigned priority as the query received at block 202. Thus, each sub-query pool can be considered the set of pending (i.e., unexecuted) sub-queries for all queries of a particular priority class. Flowchart 200 can then return to block 202 so that dynamic scheduler 112 can pre-process additional incoming queries.

Figure 3:
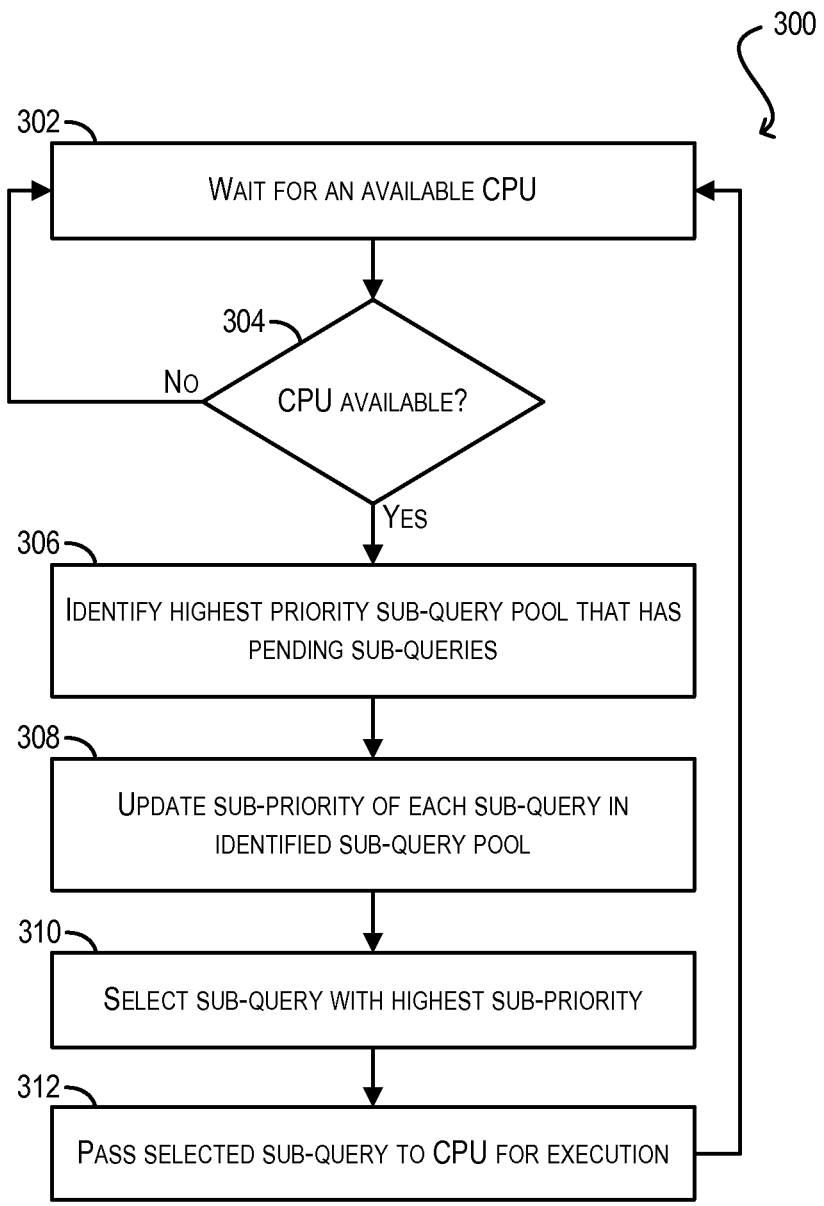
FIG. 3 depicts a flowchart for dynamically selecting a sub-query for execution according to an embodiment.

FIG. 3 depicts a flowchart 300 that dynamic scheduler 112 can perform for scheduling a sub-query for execution according to an embodiment. In various embodiments, dynamic scheduler 112 can perform flowchart 300 in parallel with flowchart 200 of FIG. 2.

At blocks 302 and 304, dynamic scheduler 112 can execute a loop and wait for a computing resource (e.g., CPU) of server 102 to become available for query processing. Once a CPU becomes available, dynamic scheduler 112 can identify the highest priority sub-query pool (i.e., the sub-query pool comprising sub-queries of queries having the highest priority) that has pending sub-queries (block 306). In this way, dynamic scheduler 112 can determine the most time-sensitive pending sub-queries.

At block 308, dynamic scheduler 112 can update the sub-priority of each sub-query in the identified sub-query pool. As noted with respect to block 208 of FIG. 2, in certain embodiments the sub-priority of each sub-query can reflect a resource consumption metric of the sub-query's parent query (e.g., CPU, memory, and/or I/O usage). In these embodiments, the processing at block 308 can comprise determining the amount of resources that have been allocated to (or consumed by) each sub-query's parent query thus far, and adjusting the sub-query's sub-priority in accordance with this statistic.

In one embodiment, the higher the resource consumption metric for a given sub-query's parent query, the lower the sub-query's sub-priority. For example, if parent query P1 for sub-query Q1 has consumed 2 seconds of CPU time so far, dynamic scheduler 112 can adjust the sub-priority for sub-query Q1 to −2, while if parent query P2 for sub-query Q2 has consumed only 1 second of CPU time so far, dynamic scheduler 112 can adjust the sub-priority for sub-query Q2 to −1. In this manner, dynamic scheduler 112 can favor the sub-queries of lighter queries, such that those sub-queries are more likely to be selected for execution over the sub-queries of heavier queries.

Once the sub-query sub-priorities have been updated per block 308, dynamic scheduler 112 can select the sub-query in the identified sub-query pool with the highest updated sub-priority (block 310). Dynamic scheduler 112 can then pass the selected sub-query to the available CPU for execution (block 312). Although not shown, dynamic scheduler 112 can also remove the selected sub-query from the sub-query pool at this point so that the sub-query is no longer considered pending. Finally, dynamic scheduler 112 can return to block 302 in order to schedule additional sub-queries as further CPUs become available.

It should be appreciated that the sub-query selection process of FIG. 3 is illustrative and various modifications are possible. For instance, while the foregoing description of FIG. 3 includes an example where an absolute resource consumption metric (e.g., absolute CPU time) is used as a basis for adjusting sub-priorities, in some embodiments a relative resource consumption metric can be used. This can avoid scenarios where the sub-queries of a heavy query "starve" (i.e., are forced to wait an excessively long time for execution), which may occur if new queries are constantly being received by the information retrieval system.

By way of example, the relative resource consumption metric can be defined in terms of relative CPU usage as shown below:

$$\text{relative } CPU \text{ usage} = \frac{\text{total } CPU \text{ time allocated to query}}{(\text{current system time} - \text{query arrival time})} \times 100\%$$

With this metric, dynamic scheduler 112 will still favor light queries over heavy queries in the general case, since light queries will consume less total CPU time (and thus result in a higher sub-priority for their respective sub-queries). At the same time, the relative CPU usage metric will shrink in size as a given query gets "older" (i.e., the difference between the current system time and the query's arrive time increases), and thus cause dynamic scheduler 112 to also favor queries that have been waiting for a long time to be scheduled/completed. If a query is not scheduled for execution for a while, its relative CPU usage will eventually shrink (and its sub-query sub-priorities will correspondingly rise) to the point where its sub-queries will be scheduled with high probability.

Figure 4:
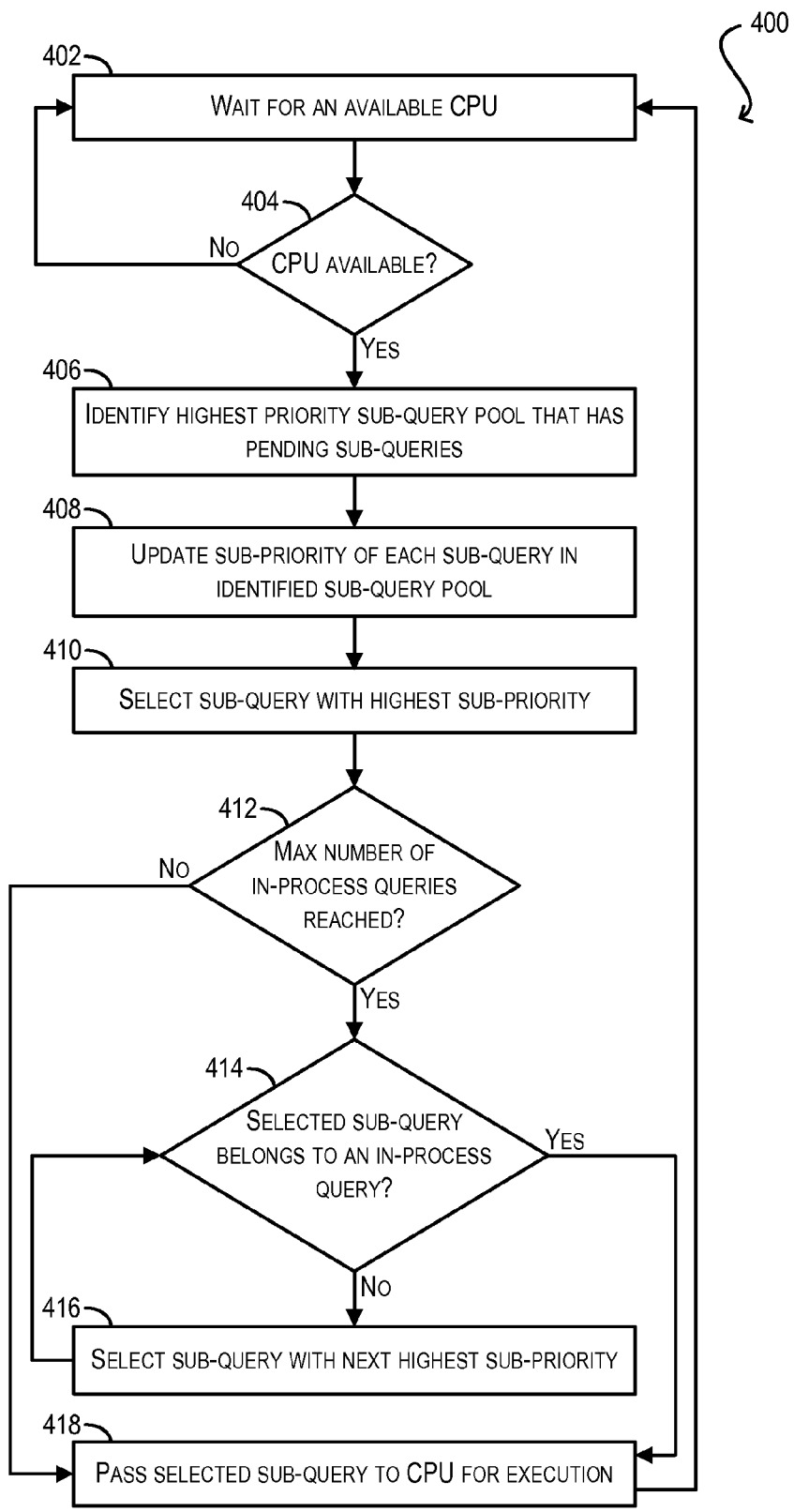
FIG. 4 depicts another flowchart for dynamically selecting a sub-query for execution according to an embodiment.

In further embodiments, as part of the sub-query selection process of FIG. 3, dynamic scheduler 112 can keep track of the total number of "in-process" queries (i.e., queries that have begun execution but are not yet completed) and can prevent the selection of a sub-query belonging to a new query if the number of in-process queries has reached a predefined threshold. This can conserve memory usage on server 102, since each in-process query typically requires a certain amount of memory in order to maintain its running state. FIG. 4 depicts a flowchart 400 of a modified sub-query selection process that illustrates this feature.

As shown in FIG. 4, blocks 402-410 are substantially similar to blocks 302-310 of FIG. 3. However, once the sub-query with the highest sub-priority in the identified sub-query pool is selected at block 410, dynamic scheduler 112 can check whether the maximum number of in-process queries has been reached (block 412). If not, dynamic scheduler 112 can pass the selected sub-query to the available CPU for execution (block 418) and the entire sub-query selection process can repeat.

On the other hand, if the maximum number of in-process queries has been reached, dynamic scheduler 112 can check whether the selected sub-query belongs to one of the in-process queries (block 414). If so, dynamic scheduler 112 can pass the selected sub-query to the available CPU for execution as noted above (block 418). Otherwise, dynamic scheduler 112 can select a sub-query in the identified pool with the next highest sub-priority (block 416), and can return to block 414 in order to determine whether this newly selected sub-query belongs to one of the in-process queries. Blocks 414 and 416 can iterate until dynamic scheduler 112 finds a sub-query belonging to an in-process query, thereby avoiding the selection/execution of a brand new query.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Many variations, modifications, additions, and improvements to the embodiments described herein are possible. For example, plural instances can be provided for components, operations, or structures described herein as a single instance. Further, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for scheduling query execution, the method comprising:
   receiving, by a computer system, a query to be executed;
   assigning, by the computer system, a priority to the query, the priority being identical to priorities assigned to one or more previously received queries;
   dividing, by the computer system, the query into a plurality of sub-queries;
   assigning, by the computer system, a sub-priority to each sub-query in the plurality of sub-queries, wherein the sub-priority for each sub-query of the query is identical to each other, and wherein the sub-priority is based on a resource consumption metric of the query that reflects an amount of computing resources consumed due to execution of the query;
   selecting, by the computer system from a plurality of sub-query pools, a sub-query pool that is associated with the priority of the query, the selected sub-query pool including sub-queries of the one or more previously received queries; and
   adding, by the computer system, the plurality of sub-queries to the selected sub-query pool.

2. The method of claim 1 further comprising, when a CPU is available for executing a sub-query:
   identifying a sub-query pool from the plurality of sub-query pools that includes one or more unexecuted sub-queries and is associated with the highest priority;
   updating the sub-priority for each sub-query in the identified sub-query pool;
   selecting a sub-query from the identified sub-query pool having the highest sub-priority; and
   scheduling the selected sub-query for execution on the CPU.

3. The method of claim 1 wherein the resource consumption metric is a relative metric.

4. The method of claim 1 wherein the priority is based on time sensitivity of the query.

5. The method of claim 2 wherein the computer system is configured to keep track of a total number of in-process queries, and wherein if the total number reaches a preconfigured threshold, the computer system is configured to avoid selection of sub-queries from the identified sub-query pool that do not belong to an in-process query.

6. The method of claim 1 wherein data against which the query is to be executed is organized into a plurality of buckets, each bucket including a subset of the data that corresponds to a range within a data dimension.

7. The method of claim 6 wherein each sub-query in the plurality of sub-queries is an instance of the query that is constrained to data within a single bucket.

8. A non-transitory computer readable storage medium having stored thereon software executable by a computer system, the software embodying a method that comprises:
   receiving a query to be executed;
   assigning a priority to the query, the priority being identical to priorities assigned to one or more previously received queries;
   dividing the query into a plurality of sub-queries;
   assigning a sub-priority to each sub-query in the plurality of sub-queries, wherein the sub-priority for each sub-query of the query is identical to each other, and wherein the sub-priority is based on a resource consumption metric of the query that reflects an amount of computing resources consumed due to execution of the query;

selecting, from a plurality of sub-query pools, a sub-query pool that is associated with the priority of the query, the selected sub-query pool including sub-queries of the one or more previously received queries; and adding the plurality of sub-queries to the selected sub-query pool.

9. The non-transitory computer readable storage medium of claim 8 wherein the method further comprises, when a CPU is available for executing a sub-query:

identifying a sub-query pool from the plurality of sub-query pools that includes one or more unexecuted sub-queries and is associated with the highest priority;

updating the sub-priority for each sub-query in the identified sub-query pool;

selecting a sub-query from the identified sub-query pool having the highest sub-priority; and scheduling the selected sub-query for execution on the CPU.

10. The non-transitory computer readable storage medium of claim 8 wherein the resource consumption metric is a relative metric.

11. The non-transitory computer readable storage medium of claim 8 wherein the priority is based on time sensitivity of the query.

12. The non-transitory computer readable storage medium of claim 9 wherein the software is configured to keep track of a total number of in-process queries, and wherein if the total number reaches a preconfigured threshold, the software is configured to avoid selection of sub-queries from the identified sub-query pool that do not belong to an in-process query.

13. The non-transitory computer readable storage medium of claim 8 wherein data against which the query is to be executed is organized into a plurality of buckets, each bucket including a subset of the data that corresponds to a range within a data dimension.

14. The non-transitory computer readable storage medium of claim 13 wherein each sub-query in the plurality of sub-queries is an instance of the query that is constrained to data within a single bucket.

15. A computer system comprising:
a processor; and
a non-transitory computer readable medium having stored thereon program code that causes the processor to, upon being executed:
receive a query to be executed;
assign a priority to the query, the priority being identical to priorities assigned to one or more previously received queries;
divide the query into a plurality of sub-queries;
assign a sub-priority to each sub-query in the plurality of sub-queries, wherein the sub-priority for each sub-query of the query is identical to each other, and wherein the sub-priority is based on a resource consumption metric of the query that reflects an amount of computing resources consumed due to execution of the query;
select, from a plurality of sub-query pools, a sub-query pool that is associated with the priority of the query, the selected sub-query pool including sub-queries of the one or more previously received queries; and
add the plurality of sub-queries to the selected sub-query pool.

16. The computer system of claim 15 wherein the program code further causes the processor to, when a CPU is available for executing a sub-query:

identify a sub-query pool from the plurality of sub-query pools that includes one or more unexecuted sub-queries and is associated with the highest priority;

update the sub-priority for each sub-query in the identified sub-query pool;

select a sub-query from the identified sub-query pool having the highest sub-priority; and schedule the selected sub-query for execution on the CPU.

17. The computer system of claim 15 wherein the resource consumption metric is a relative metric.

18. The computer system of claim 15 wherein the priority is based on time sensitivity of the query.

19. The computer system of claim 16 wherein the processor is configured to keep track of a total number of in-process queries, and wherein if the total number reaches a preconfigured threshold, the processor is configured to avoid selection of sub-queries from the identified sub-query pool that do not belong to an in-process query.

20. The computer system of claim 15 wherein data against which the query is to be executed is organized into a plurality of buckets, each bucket including a subset of the data that corresponds to a range within a data dimension.

21. The computer system of claim 20 wherein each sub-query in the plurality of sub-queries is an instance of the query that is constrained to data within a single bucket.

22. The method of claim 3 wherein the resource consumption metric shrinks in size as the query gets older.

23. The non-transitory computer readable storage medium of claim 10 wherein the resource consumption metric shrinks in size as the query gets older.

24. The computer system of claim 17 wherein the resource consumption metric shrinks in size as the query gets older.

* * * * *